(12) United States Patent
Araki

(10) Patent No.: US 7,460,864 B2
(45) Date of Patent: Dec. 2, 2008

(54) ROADSIDE NARROWBAND WIRELESS COMMUNICATION APPARATUS

(75) Inventor: Hiroshi Araki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 395 days.

(21) Appl. No.: 11/224,046

(22) Filed: Sep. 13, 2005

(65) Prior Publication Data

US 2006/0068776 A1   Mar. 30, 2006

(30) Foreign Application Priority Data

Sep. 29, 2004   (JP) .................... 2004-284087

(51) Int. Cl.
*H04Q 7/00*   (2006.01)
*H04Q 7/20*   (2006.01)

(52) U.S. Cl. .................. 455/423; 455/67.11; 455/67.14; 370/328; 370/334

(58) Field of Classification Search .............. 455/423, 455/67.11, 67.14; 370/334, 328
See application file for complete search history.

(56) References Cited

U.S. PATENT DOCUMENTS

| | | | | |
|---|---|---|---|---|
| 5,875,183 A | * | 2/1999 | Nitadori | 370/328 |
| 6,127,975 A | * | 10/2000 | Maloney | 342/457 |
| 2002/0066055 A1 | * | 5/2002 | Kim | 714/704 |

FOREIGN PATENT DOCUMENTS

| EP | 1 089 579 A1 | | 4/2001 |
|---|---|---|---|
| EP | 1089579 A1 | * | 4/2001 |

* cited by examiner

*Primary Examiner*—George Eng
*Assistant Examiner*—Brandon J Miller
(74) *Attorney, Agent, or Firm*—Leydig, Voit & Mayer, Ltd.

(57) ABSTRACT

A baseband signal is used for transmission between a roadside antenna apparatus and a roadside apparatus. A setting tool, such as a personal computer, is connected to the roadside apparatus so that adjustment/setting of the roadside antenna apparatus may be remotely performed with the setting tool. The baseband signal and the remote control signal are compressed and transmitted on an ordinary transmission signal.

11 Claims, 9 Drawing Sheets

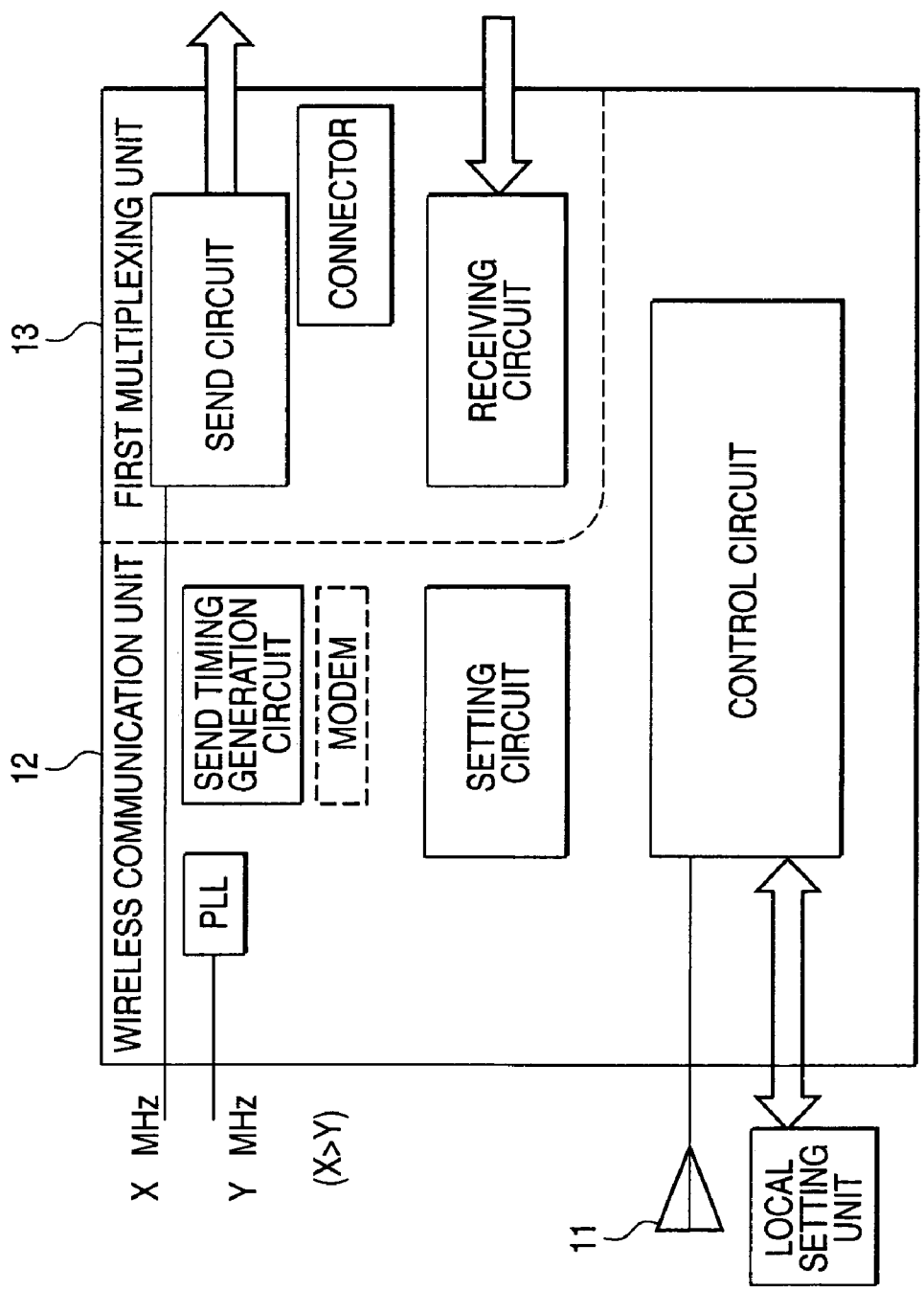

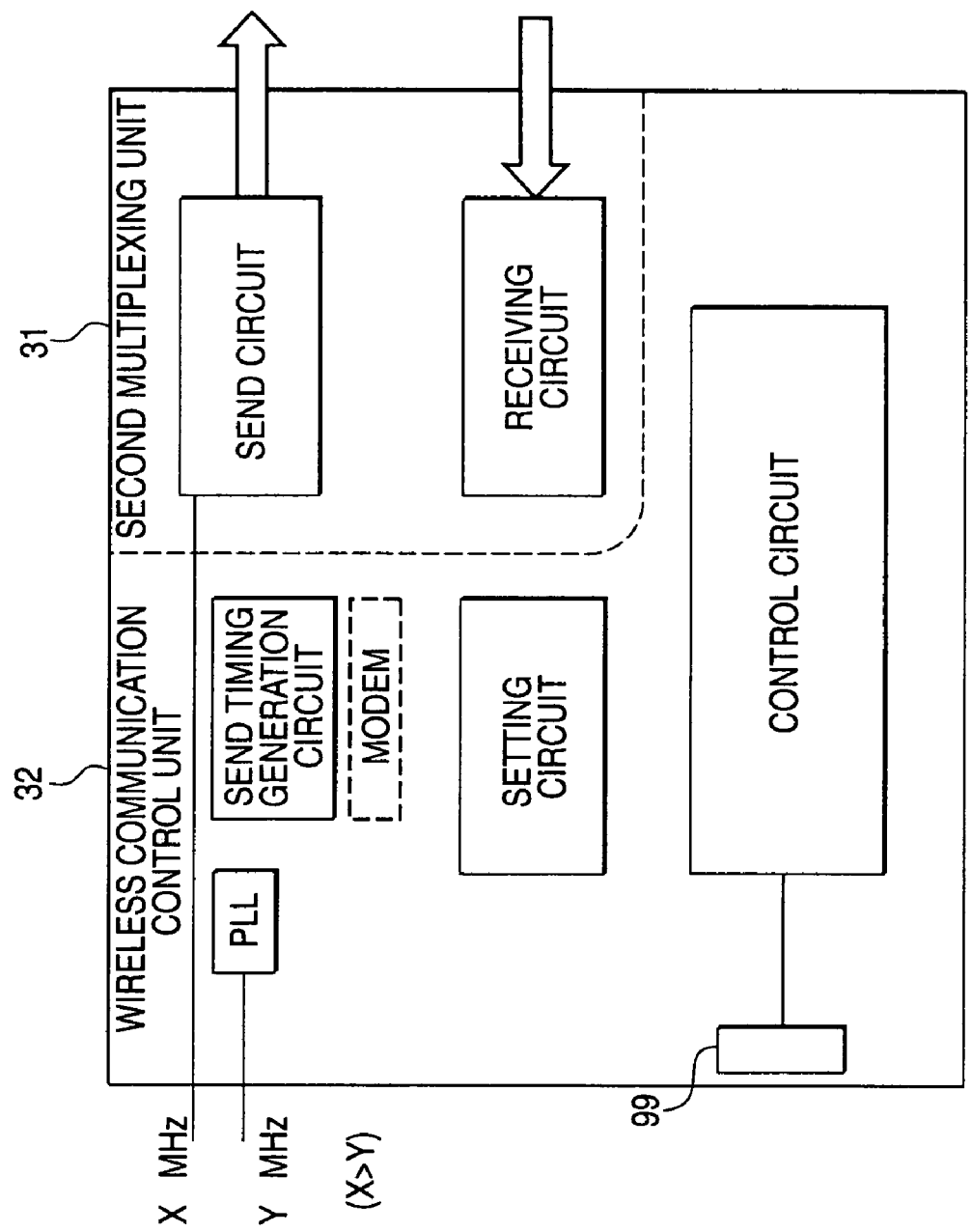

REMOTE NORMAL MODE

REMOTE LOOP BACK MODE

AUTOMATIC MODE

AUTOMATIC LOOP BACK MODE

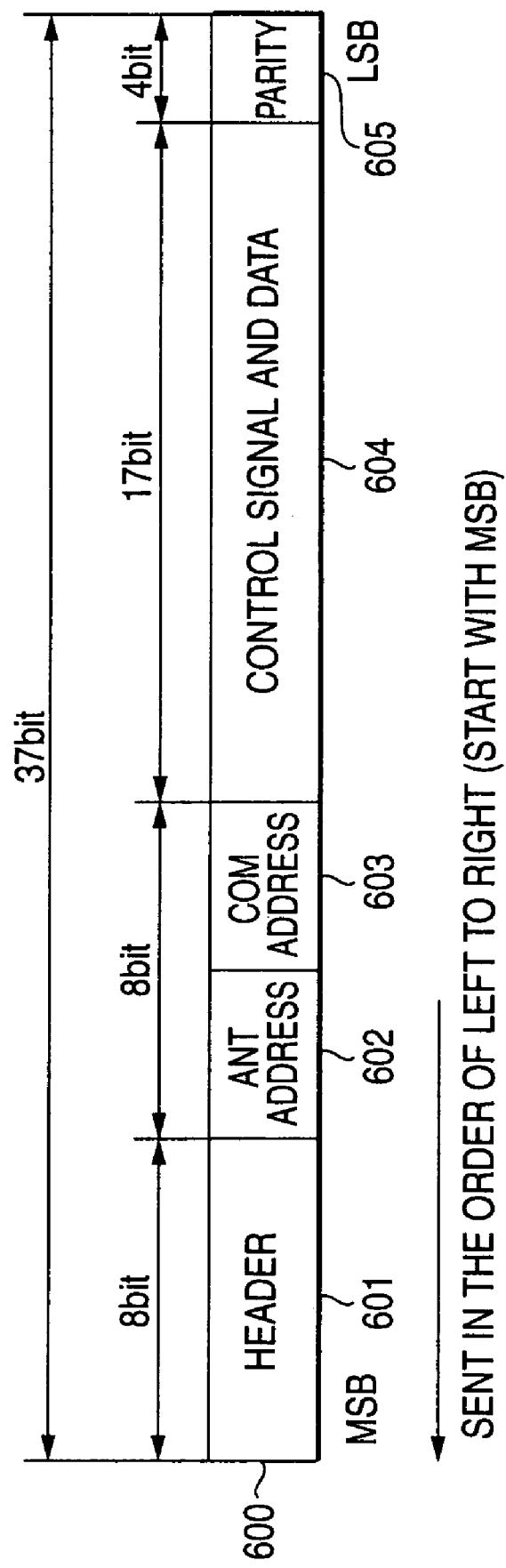

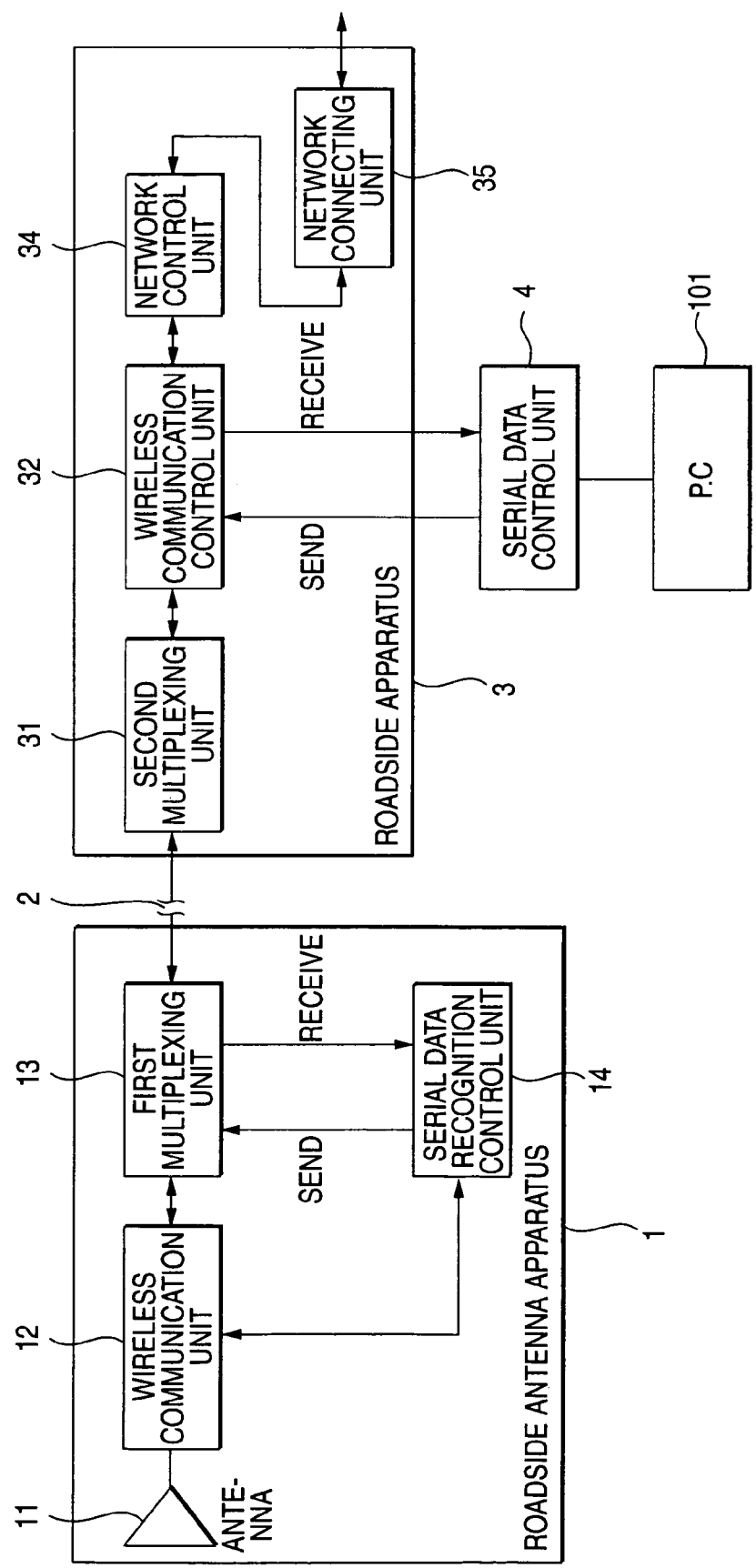

WIRED CONNECTION USING OPTICAL FIBER

WIRED CONNECTION USING COAXIAL CABLE

WIRED CONNECTION USING TWIST CABLE

WIRELESS CONNECTION USING SPATIAL LIGHT AND MILLIMETER WAVE

ROADSIDE NARROWBAND WIRELESS COMMUNICATION APPARATUS

BACKGROUND OF THE INVENTION

1. Field of the Invention

The present invention relates to a roadside narrowband wireless communication apparatus to be used for a road-to-vehicle narrowband wireless communication system.

2. Description of the Related Art

A road-to-vehicle narrowband wireless communication system for communicating various information between a narrowband wireless communication apparatus mounted on a vehicle traveling on a road and a roadside antenna apparatus installed on the road has been known. The road-to-vehicle narrowband wireless communication system is becoming capable of handling plural service systems in addition to communication relating to receipt of tolls by ETC, such as so-called VICS for offering traffic information, the Internet, and communication for various services in parking areas are handled.

Since the service systems are originally independently constructed systems, they are different in radio frequency, and it is difficult to make an on-board unit to be compatible with all the services by the use of one wireless antenna. However, it is difficult to provide plural antennas on a vehicle from the view points of limited space area, cost, and appearance Also, it is undesirable from the cost point of view to install the roadside narrowband wireless communication system for each of the services.

In FIG. 2 of JP-A-2001-103016, there is disclosed a system wherein an integrated base station 200 (called also as roadside apparatus) provided with a synthesis division unit 203 for multiplexing different wireless communication frequencies of services to form a common frequency to be transmitted as one frequency and dividing signals for the services after the transmission is installed as a superordinate station to a roadside antenna apparatus (referred to as a local base station 400 in JP-A-2001-103016). The system is capable of communicating to and from the roadside antenna apparatus the radio signals at the common frequency corresponding to the plural services through an optical fiber. In this case, a narrowband wireless communication apparatus mounted on a vehicle is provided with an antenna for the common frequency, a synthesis division unit for separating the signal into plural wireless frequencies corresponding to the original plural services, and plural wireless applications for the separated plural frequencies.

Since such communication service is subject to service type change, service type increase, or increase in number of vehicles allowed to use the service simultaneously, the roadside narrowband wireless communication system has to undergo alteration (hereinafter referred to as maintenance) of system so as to be in conformity with the change and increases from time to time. The system disclosed in JP-A-2001-103016 also requires such maintenance, and, in the case of maintenance, a worker must go to each of the roadside antenna apparatus installed roadside to perform tasks of setting changes and the like. Such maintenance has a cost problem due to the large number of roadside antenna apparatuses installed at an interval of several kilometers along a road and the distance between the adjacent apparatuses, i.e., since the maintenance requires a large number of workers and long time, that is, increased cost.

Also, since the system disclosed in JP-A-2001-103016 communicates signals of a carrier frequency (very high frequency) of a wireless communication between the system and a vehicle from the integrated base station 200 to each of local base stations 400 via the optical fiber, the system has a drawback that the transmission device is remarkably expensive.

SUMMARY OF THE INVENTION

A roadside narrowband wireless communication apparatus used in conventional road-to-vehicle narrowband wireless communication system is provided with a roadside antenna apparatus and a roadside apparatus, and, due to the constitution, workers have to go to the roadside antenna apparatuses in order to perform maintenance work and setting changes. Therefore, the roadside narrowband wireless communication apparatus has a problem of increased cost due to the large number of workers and long time required for the maintenance work and setting changes.

Also, since the roadside narrowband wireless communication apparatus communicates signals of a carrier frequency (very high frequency) of a wireless communication between the system and a vehicle from the integrated base station 200 to each of local base stations 400 via the optical fiber, the system has a drawback that the transmission device is remarkably expensive.

An object of this invention is to solve the above problems and to provide a roadside narrowband wireless communication apparatus which enables maintenance work such as setting changes of a roadside antenna apparatus to be performed by remote control by the use of a roadside apparatus.

Another object of this invention is to provide a less expensive roadside narrowband wireless communication apparatus by performing signal transmission between the roadside antenna apparatus and a superordinate apparatus (roadside apparatus) by using a transmitting and receiving baseband signal having a frequency much lower than a wireless communication frequency.

A roadside narrowband wireless communication apparatus according to this invention comprises: a roadside antenna apparatus having a wireless communication unit provided in the vicinity of a road and communicating a radio signal to and from a wireless communication device mounted on a vehicle traveling on the road and a first multiplexing unit connected to the wireless communication unit and communicating a transmission baseband signal transmitted from the radio signal and an adjustment signal for adjusting the wireless communication unit as a multiplexed signal; a roadside apparatus having a second multiplexing unit provided in accordance with the roadside antenna apparatus and communicating the multiplexed signal to and from the first multiplexing unit, a wireless communication control unit connected to the second multiplexing unit and communicating a signal to be converted into the multiplexed signal to and from plural signal sources to generate the baseband signal, and a network connection unit connected to the wireless communication control unit and an external wired communication network and communicating data to be the transmission baseband signal to and from a system connected to the wired communication network; and an adjustment tool connected to the wireless communication control unit of the roadside apparatus and communicating the adjustment signal for remotely adjusting the roadside antenna apparatus.

A transmission speed of the multiplexed signal transmitted between the first multiplexing unit and the second multiplexing unit is higher than that of the radio signal transmitted between the wireless communication device of the vehicle and the wireless communication unit of the roadside antenna apparatus.

The roadside narrowband wireless communication apparatus according to this invention performs data transmission to and from the roadside antenna apparatus by using a baseband signal, not a radio frequency. Therefore, a frequency at which the transmission is performed is reduced to realize an extended communication distance and a reduced production cost. Also, the roadside narrowband wireless communication apparatus has an effect of realizing remote maintenance work of the roadside antenna apparatus by connecting the adjustment tool adjusting or controlling the roadside antenna apparatus without stopping ordinary signal transmission.

BRIEF DESCRIPTION OF THE DRAWINGS

FIG. 3 is a block diagram showing a roadside antenna apparatus in the block shown in FIG. 2;

FIG. 4 is a block diagram showing a roadside apparatus in the block shown in FIG. 2;

FIG. 6 is a diagram showing a structure of a packet signal communicated between the roadside antenna apparatus and the roadside apparatus;

FIG. 7 is a block diagram showing a narrowband wireless communication apparatus according to a second embodiment;

DESCRIPTION OF THE PREFERRED EMBODIMENTS

Embodiment 1

Figure 1:
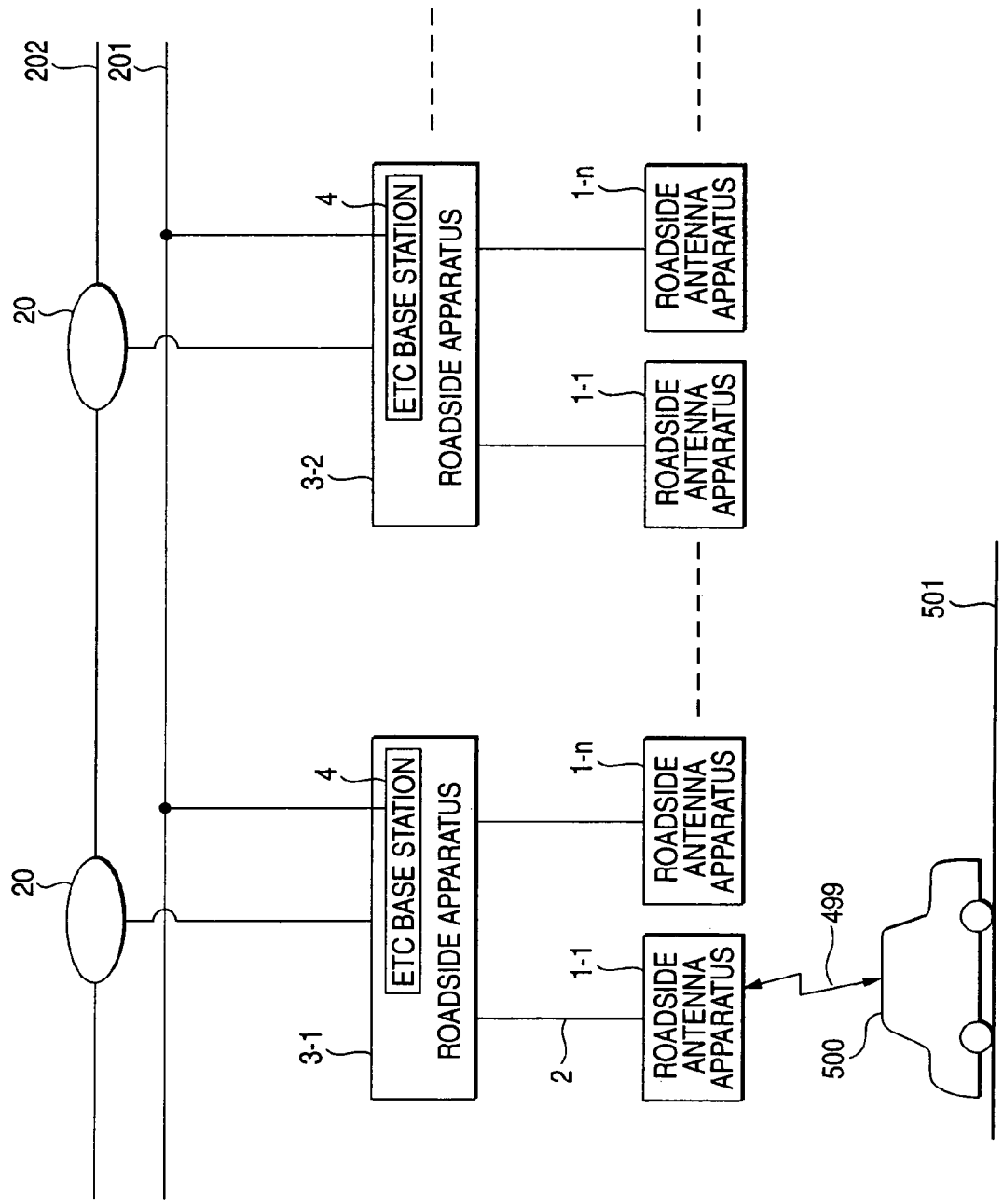
FIG. 1 is a block diagram showing a road-to-vehicle wireless communication system using a narrowband wireless communication apparatus of this invention.

FIG. 1 is a block diagram to be used for illustrating a road-to-vehicle narrowband wireless communication system as a whole, the system performing a road-to-vehicle narrowband wireless communication according to the first embodiment of this invention. An on-vehicle wireless communication apparatus (not shown) is mounted on a vehicle 500, and roadside antenna apparatuses 1 (hereinafter denoted by 1-1 to 1-n) are installed on a road 501 at an interval of several kilometers, so that data communication is performed between the vehicle 500 and the roadside antenna apparatuses 1 by wireless communication line 499.

The roadside antenna apparatuses 1 are divided into several groups each including several roadside antenna apparatuses 1 to be connected to a roadside apparatuses 3 (hereinafter sometimes denoted by 3-1 to 3-n) via a connection cable 2.

The roadside apparatus 3 is provided with plural base stations (only one base station is shown in the drawing for brevity) for various services, such as an ETC base station 47, a data terminal equipment of a bank (not shown). Each of the base stations is connected to a network suitable for performing the service, such as an ETC network 201 and an internet network 202, via a wire communication network such as a telephone network and an optical communication network.

The roadside narrowband wireless communication apparatus of the first embodiment includes the roadside antenna 1, the roadside apparatus 3, and the connection cable 2. The communication between the roadside antenna apparatus 1 and the roadside apparatus 3 is not limited to the wire communication, and wireless communication is usable. In the case of the wireless communication, it is of course possible to omit the connection cable 2.

Hereinafter, details of the roadside antenna apparatus 1, the connection cable 2, the roadside apparatus 3, and the like will be described.

Figure 2:
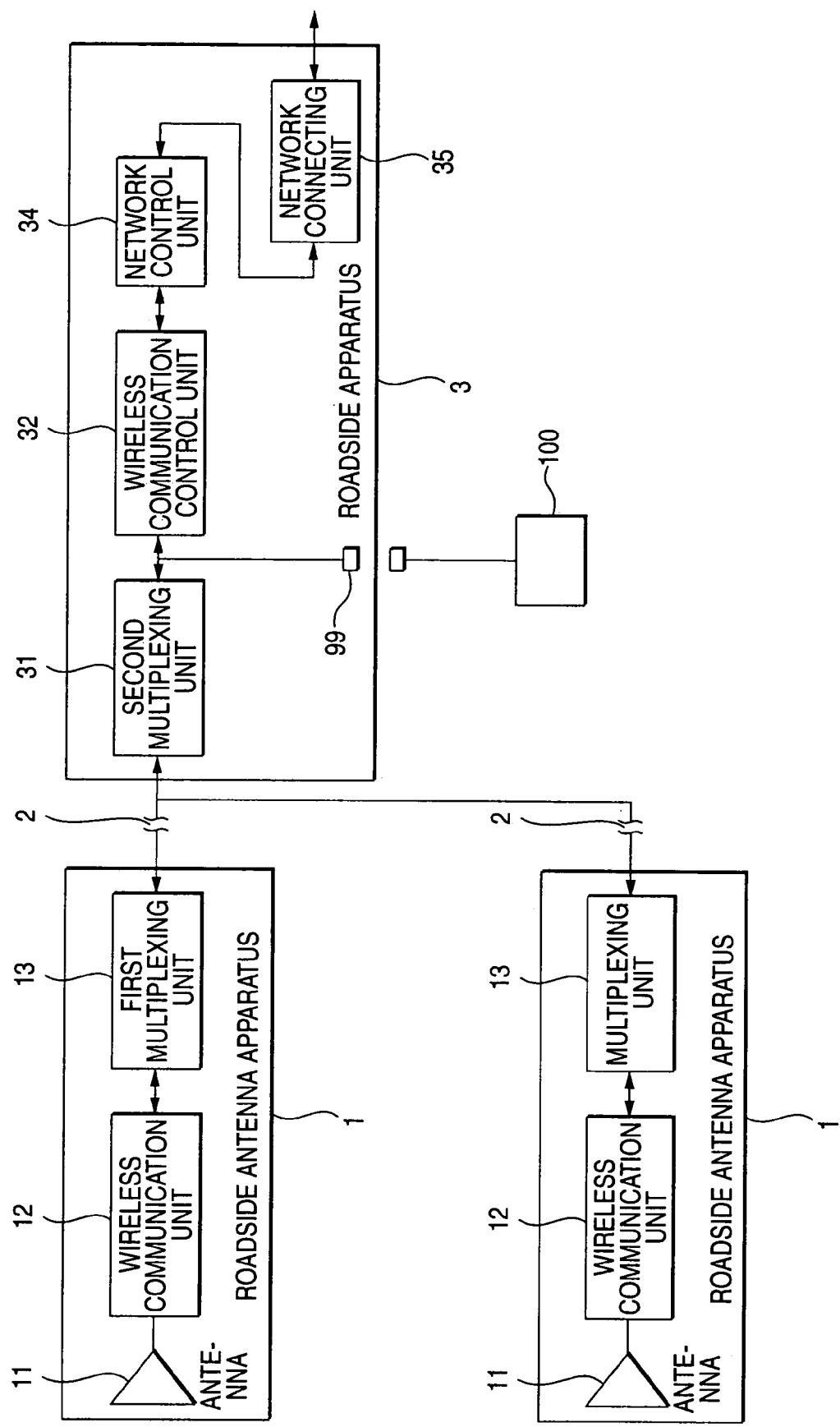
FIG. 2 is a block diagram showing a narrowband wireless communication apparatus according to a first embodiment.
Figure 5A:
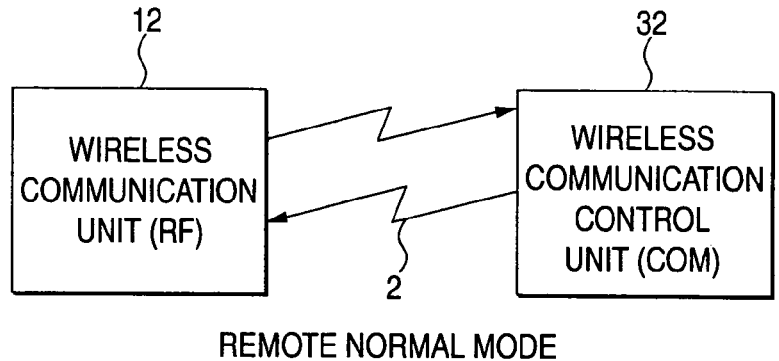
FIGS. 5A-5D are diagrams illustrating an operation mode of the narrowband wireless communication apparatus shown in FIG. 2.
Figure 5B:
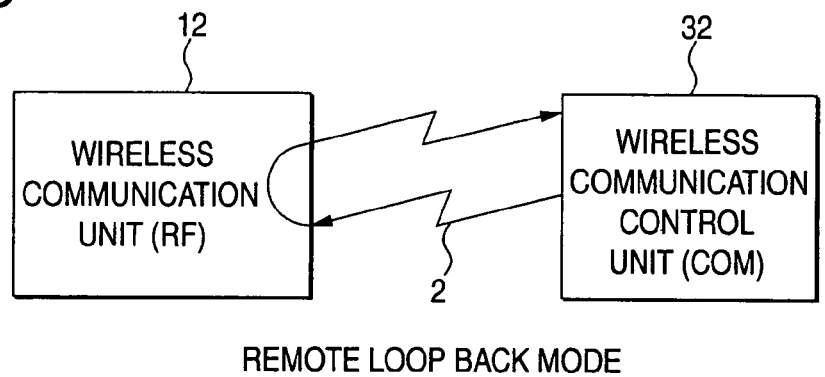
Figure 5C:
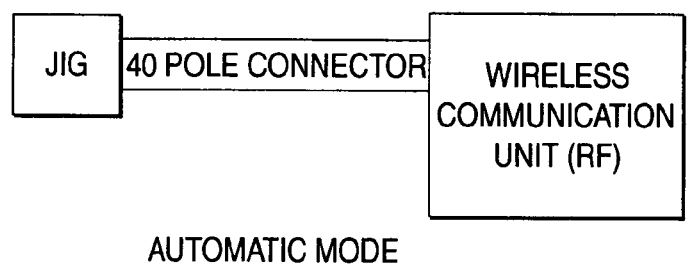
Figure 5D:
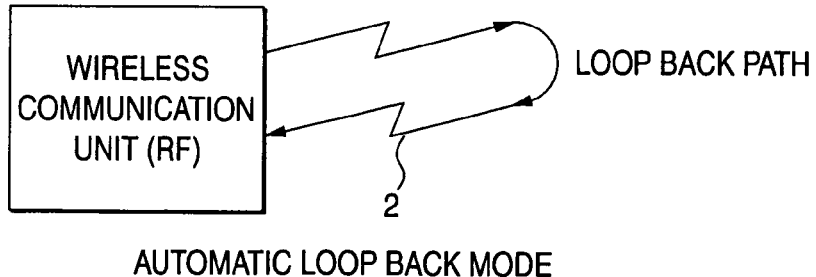

Shown in FIG. 2 is a detailed structure of a part of the roadside antenna apparatus 1, the connection cable 2, and the roadside apparatus 3.

Though only 2 roadside antenna apparatuses 1 are shown in FIG. 2, plural roadside antenna apparatuses may be connected to one roadside apparatus 3 as described in FIG. 1. The roadside antenna apparatus 1 includes a vehicle 500, an antenna 11 for wireless communication, a wireless communication unit 12 connected to the antenna 11, and a first multiplexing unit 13 connected to the wireless communication unit 12 to perform data transmission. The roadside apparatus 3 includes a second multiplexing unit 31, a wireless communication control unit 32, a network controller 34 for controlling data transmission to and from a wired network, and a network connection unit 36 to be connected to the wired network. Also, a setting tool 100 may be connected to the roadside apparatus 3 via an interface 99. The setting tool 100 is an appliance capable of inputting signals for adjusting and controlling the roadside antenna apparatus 1, such as a personal computer.

Hereinafter, main functions of the components will be described.

The antenna 11 performs transmission of wireless communication signal to and from the vehicle 500 and decides a communication area on the road 501 by appropriate radiation directivity. The wireless communication unit 12 supplies a radio signal modulated into a send baseband signal to the antenna 11. The wireless communication unit 12 demodulate the radio signal supplied from the antenna 11 into a receive baseband signal. The first multiplexing unit 13 performs serial/parallel conversion of the baseband signal and wireless communication unit control data from the wireless communication unit 12 to generate packet data having a predetermined length and then converts the packet data into that having a level according to specification of a predetermined signal line to send the data.

The second multiplexing unit 31 receives the signal of the level according to the specification of the predetermined connection cable 2 from the wireless communication control unit 32 and replays the packet data of the predetermined length to perform parallel/serial conversion of the transmission baseband signal and the wireless communication unit control data. Since the packet data have a frequency lower than that of the wireless communication signal, both an optical cable and a coaxial cable can be used as the connection cable. In this specification, the connection cable 2 of the first embodiment 1 is the optical cable.

Since the first multiplexing unit 13 of the roadside antennal apparatus 1 and the second multiplexing unit 31 of the roadside apparatus 3 are connected to each other by the connection cable 2, the wireless communication unit 12 and the wireless communication control unit 32 are mutually connected to each other by at least one arbitrary signal line. It is necessary to assign a unique address to each of the roadside antenna apparatuses 1 in order to identify each of the plural roadside antenna apparatuses 1.

The setting tool 100 is a serially connected personal computer, for example, and setting/maintenance of the roadside antenna apparatus 1 is achieved by performing various inputs described later in this specification using the setting tool 100.

Structures of the wireless communication unit 12 and the first multiplexing unit 13 of the roadside apparatus 1 will be described in detail with reference to FIG. 3. Since the components shown in FIG. 3 have a shared part such as microcomputer, they are not separated perfectly as the wireless communication unit 12 and the multiplexing unit 13 shown in FIG. 2. Therefore, a function is indicated in a block in FIG. 3.

As described in the foregoing, an optical fiber is used as the connection cable 2 for connecting the first multiplexing unit 13 to the second multiplexing unit 31 in this embodiment 1. The specification of the communication is selected from full duplex communication and semi duplex communication depending on a transmission quantity of the signals. In the case of the full duplex communication, 2 optical fibers must be used for achieving 2 optical transmission systems. In the case of the semi duplex communication, one optical fiber is used since only one optical transmission system is required. However, it is possible to use 2 transmission systems separately for sending and receiving in the semi duplex communication; in this case, 2 optical fibers are required. A connection signal line of the multiplexed signal transmission is not limited to the optical fiber, and a twisted pair wire, a coaxial cable, or the like may be used in wired communication. A radio signal such as an optical space propagation signal and a radio wave propagation signal may be used in the multiplexed signal transmission.

A modem unit includes a wireless modulation demodulation circuit and a high frequency circuit.

A setting circuit forms a circuit selecting setting data from a wireless communication unit frequency setting table for frequency synthesizer (not shown) or the like used in the high frequency circuit and supplying the setting data via the wireless communication unit frequency setting circuit.

A control circuit includes a circuit for performing a series of controls inside the wireless communication unit.

Hereinafter, the circuit configuration of this embodiment will be described in detail.

Functions and structures of the second multiplexing unit 31 of the roadside apparatus 3 and a part of the wireless communication control unit 32 will be described with reference to FIG. 4. The structures shown in FIG. 4 are almost the same as those of the wireless communication unit 12 of the roadside antenna apparatus 1 and the function block diagram of the first multiplexing unit 13 shown in FIG. 3. The control circuit is provided with an interface 99, so that the control circuit can exchange information with a man-machine setting tool 100 (ex. personal computer) to be connected externally.

Hereinafter, operation of a send circuit 31A of the second multiplexing unit 31 of FIG. 4 will be described. Values of the frequencies used in the following description are examples and not limitative.

Information generated by using 65.536 MHz system, for example, is synchronized with a sending clock 155.52 MHz (indicated as XMHz in FIGS. 3 and 4) by the use of a synchronizing circuit (not shown) incorporated into a send unit. Address information and parity information are added to the synchronized information to generate a packet 600. The thus-generated packet 600 is sent to the connection cable 2 via the parallel-serial conversion circuit (not shown) incorporated into the send circuit. A structure of the packet is shown in FIG. 5.

Since operation of a receiving circuit 31B of the second multiplexing unit 31 shown in FIG. 4 is substantially the same as this operation except for the direction of signals, the explanation is omitted in this specification.

The roadside apparatus 3 can perform communication with an arbitrarily selected roadside antenna apparatus 1 by inputting a command to the connected setting tool or operating a switch (not shown) in the following 2 modes.

1) Remote normal mode;
2) Remote loop back mode.

The roadside antenna apparatus 1 is provided with a switchboard (not shown), so that it is possible for a user to go to the roadside antenna apparatus 1 and perform setting in the following 2 modes.

3) Automatic mode;
4) Automatic loop back mode.

Hereinafter, details of operation of each of the above modes will be described.

1) Remote Normal Mode

The wireless communication unit 12 performs a predetermined operation in accordance with control by the wireless communication control unit 32. For instance, the wireless communication unit 12 sends an RF signal (status signal) at a constant interval (at 4.096 MHz cycle, for example) A frequency of the wireless communication unit 12 is set by referring to a table in accordance with command information received from the wireless communication control unit 32 (the setting is performed only after receiving the signal from the wireless communication control unit 32).

Of course, other settings of the roadside antenna apparatus 1 can be performed. A flow of signals in the remote normal mode is shown in FIG. 5(*a*).

After the completion of the frequency setting, a modem output signal and a signal of a wireless communication unit output system are sent to the connection cable 2 at the constant cycle (The transmission is not performed during a period from the completion of the wireless communication unit frequency setting to recognition of a PLL lock signal by the wireless communication unit).

2) Remote Loop Back Mode

When the wireless communication unit 12 recognizes that header information of data sent from the wireless communication control unit 32 is a loop back code, the wireless communication unit 12 sends signals sent from the wireless communication control unit 32 by loop back transmission at a constant interval (at the above described constant cycle, for example). That is, the control on the wireless communication unit is not performed. A flow of signals in the remote loop back mode is shown in FIG. 5(*b*).

3) Automatic Mode

This mode is used for performing an operation test on a wireless communication unit and an operation test in cooperation with a dedicated access point. As in the remote normal mode, a frequency of the wireless communication unit is set first after inputting the power (the frequency setting in the automatic mode is designated by a digital switch (not shown) provided in each of the roadside antenna apparatuses 1).

4) Automatic Loop Back Mode

This mode is used for performing a communication test between the first multiplexing unit 13 of the roadside antenna apparatus 1 and fold back point of the connection cable 2 of the second multiplexing unit 31 of the roadside apparatus 3. A test pattern is continuously sent to be continuously compared with those received on the loop back path.

Hereinafter, a structure of a packet exchanged between the roadside antenna apparatus 1 and the roadside apparatus 3 will be described with reference to FIG. 6. A structure of the packet 600 is shown in FIG. 6, and the packet 600 includes a header 601, an ANT address 602 for specifying the roadside antenna apparatus 1, a COM address 603 for specifying the roadside apparatus 3, a signal for setting/adjusting and controlling the roadside antenna apparatus 1 input from the adjustment tool 100, data 604 of an original application handled by the road-to-vehicle communication system (for example, toll data of ETC), and a parity 605. The ANT address 602 and the COM address 603 are used as the above-described control signal.

The packet 600 is sent as its header 601 being leading edge to be received as the header 601 being leading edge. Since the data 604 is a mixture of the control signal and data, it is compressed in the region of 604 in order to prevent loss of the original communication speed. That is, the wireless communication transmission baseband signal, the wireless communication transmission reference clock signal, and the control signal from the wireless communication unit 12 are multiplexed at a signal speed faster than the wireless transmission signal speed.

According to the above described structure, the narrowband roadside communication apparatus of this invention selects an arbitrary roadside antenna apparatus 1 by the remote operation and performs settings and maintenance with the remote control by inputting a command to the setting tool 100 such as a personal computer connected to the roadside apparatus 3.

Second Embodiment

In actual maintenance work, an identical operation (maintenance) is performed on plural roadside antenna apparatuses 1 in many cases. Such maintenance work, i.e., repetition of the same key operation for each of the apparatuses, is a waste of time though the maintenance work can be performed remotely. In order to solve such problem, a structure shown in FIG. 7 may be adopted. Referring to FIG. 7, a serial data control apparatus (for example, a serial I/F 4 such as a personal computer 101) connected to the roadside apparatus 3 transmits control contents from the personal computer 101 into multiplexed data, as serial data to be multiplexed, to control the wireless communication unit 12. A control result is multiplexed and sent as serial data from the wireless communication unit 12 to the setting tool (personal computer) 100, so that the control result is obtained by the setting tool 100.

Third Embodiment

Figure 8:
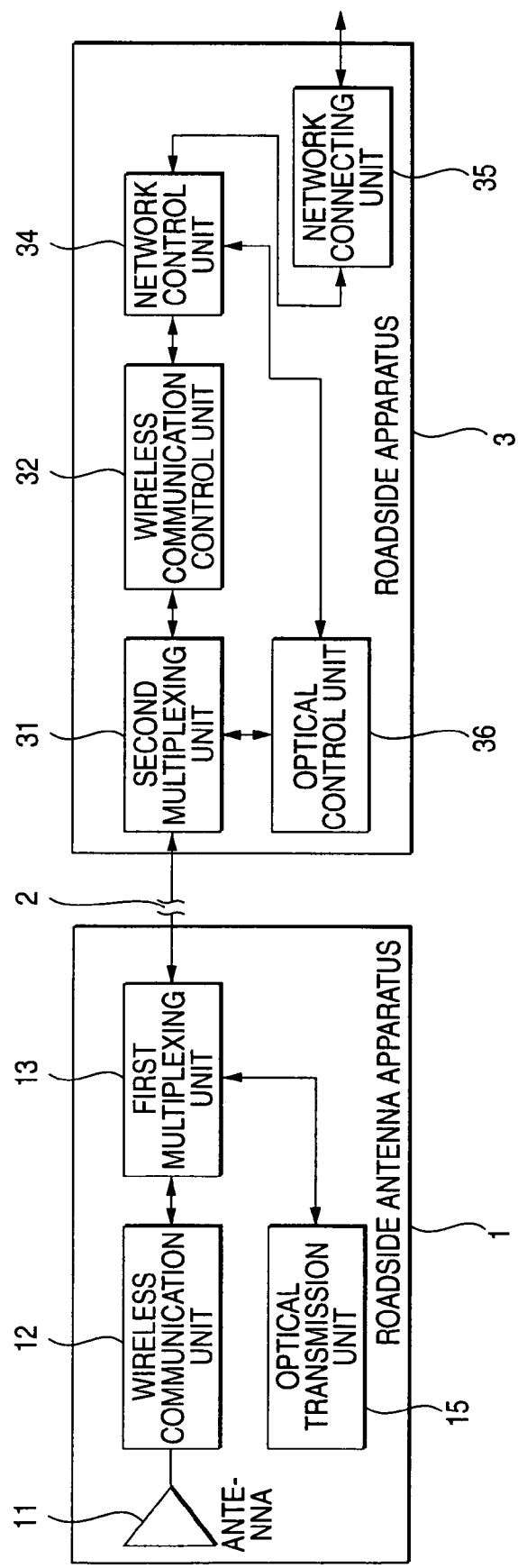
FIG. 8 is a block diagram showing a narrowband wireless communication apparatus according to a third embodiment.

FIG. 8 is a block diagram showing a structure wherein, after demodulating the wireless transmission signal from the multiplexed data sent from the roadside apparatus 3 in the roadside antenna apparatus 1, the demodulated signal is converted into an optical signal by an optical transmission unit 15 in the roadside antenna apparatus 1 to perform optical communication. In this case, since the wireless transmission signal is identical to the optical signal, it is possible to switch between electric wave and optical communication by including a switching signal in the multiplexing signal packet 600, so that it is possible to select either one of the wireless communication unit 12 or the optical transmission unit 15 as the communication unit. Also, by including an optical transmission signal separately from the wireless transmission signal by the electric wave in the multiplexing data 600, it is possible to operate the electric wave and the optical communication simultaneously without the switching.

The optical transmission unit 15 is usable for various wireless information services such as traffic information, and one example of simple usage thereof may be an optical signal for performing monitoring of a radio signal in the roadside antenna apparatus 1.

Fourth Embodiment

FIG. 9 is a diagram showing various connection methods for connecting the roadside antenna apparatus 1 to the roadside apparatus 3. Shown in FIGS. 9A to 9C are examples of wired connection, wherein shown in FIG. 9A is an example of using an optical fiber as the connection cable 2. A coaxial cable is used as the connection cable 2 in the example shown in FIG. 9B, and a twisted pair cable is used as the connection cable 2 for interconnection in the example shown in FIG. 9C. Of course, a single wire cable is used depending on a connection distance and a noise signal environment.

Figure 9A:
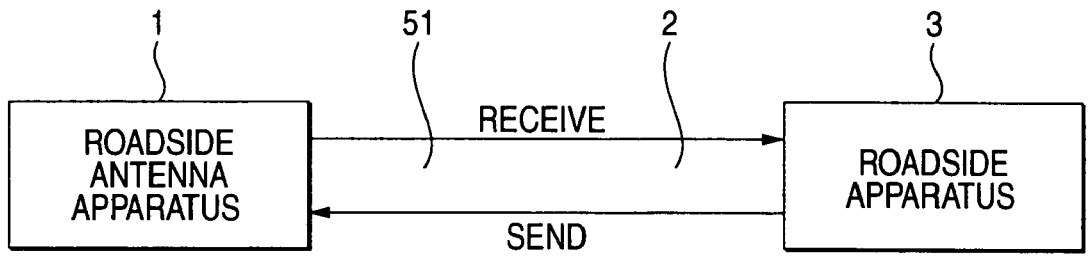
FIGS. 9A-9D are diagrams showing a narrowband wireless communication apparatus according to fourth embodiment.
Figure 9B:
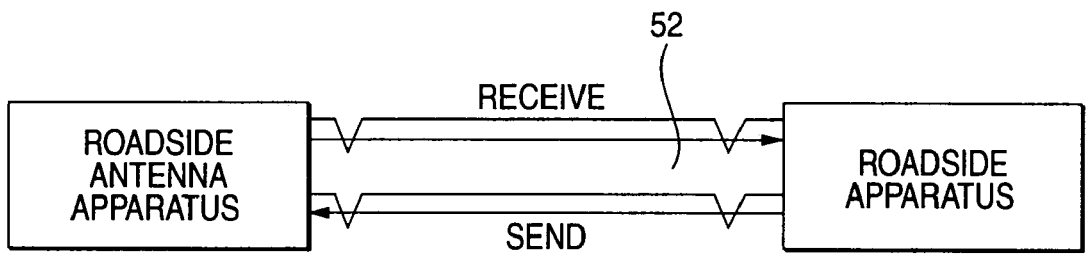
Figure 9C:
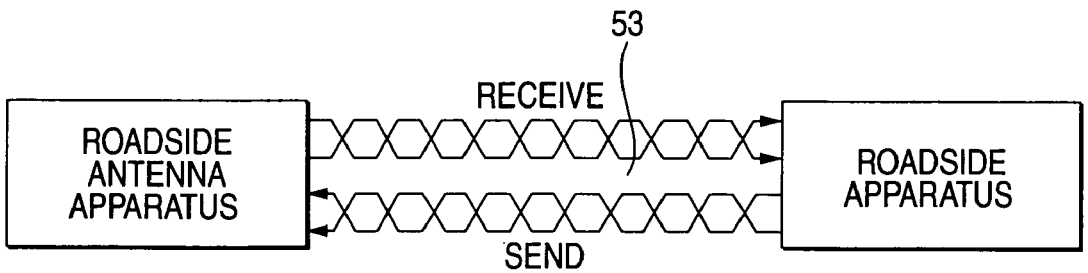
Figure 9D:
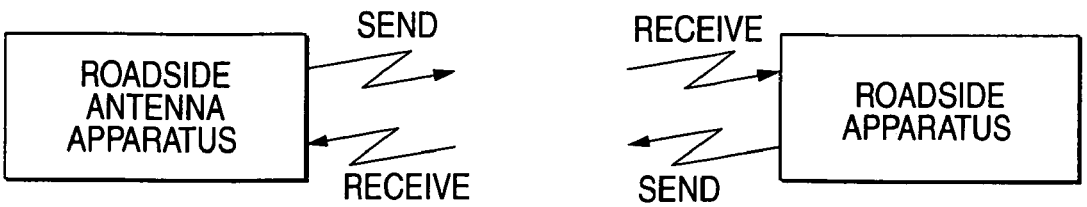

One example of wireless connection is shown in FIG. 9D, where optical communication, millimeter wave communication, or microwave communication is employed for interconnection.

Though two lines for sending and receiving are indicated in FIGS. 9A to 9D under the assumption of full duplex communication, the plural transmission lines may not be required in the semi duplex communication since it is possible to use one line for sending and receiving by switching operation.

As described in the foregoing, it is apparent that the narrowband wireless communication apparatus of this invention is usable for road-to-vehicle communication in highways, road-to-vehicle communication in general roads, and road-to-vehicle communication in tunnels and underground roads, and on top of the above usages, the narrowband wireless communication apparatus of this invention is also usable for communication between a railroad line and a train.

What is claimed is:

1. A roadside narrowband wireless communication apparatus comprising:
   a roadside antenna apparatus having
      a wireless communication unit located in the vicinity of a road, the wireless communication unit sending a first radio signal to, and receiving a second radio signal from, a wireless communication device mounted on a vehicle traveling on the road, and
   a first multiplexing unit connected to the wireless communication unit and receiving a first multiplexed signal including a transmission baseband signal and an adjustment signal, the first multiplexing unit communicating the transmission baseband signal and the adjustment signal to the wireless communication unit for adjusting the wireless communication unit;
   a roadside apparatus having
      a second multiplexing unit communicating with the roadside antenna apparatus, the second multiplexing unit sending the first multiplexed signal to, and receiving a second multiplexed signal from, the first multiplexing unit,
      a wireless communication control unit connected to the second multiplexing unit, the wireless communication control unit receiving the transmission baseband signal and sending the transmission baseband signal to the second multiplexing unit to convert the transmission baseband signal into part of the first multiplexed signal, and
      a network connection unit connected to the wireless communication control unit and to an external, wired communication network, the network connection unit sending the transmission baseband signal to the wireless communication control unit, and receiving the transmission baseband signal from a system connected to the wired communication network; and
an adjustment tool connected to the wireless communication control unit of the roadside apparatus, wherein
the second multiplexing unit transmits a transmission reference clock signal together with the transmission baseband signal, at identical signal speeds, and
the wireless communication unit of the roadside antenna apparatus generates a multiplied clock signal synchronized to the transmission reference clock signal and communicates with the wireless communication device of the vehicle based on the multiplied clock signal generated.

2. The roadside narrowband wireless communication apparatus according to claim 1, wherein transmission speed of the first and second multiplexed signals transmitted between the first multiplexing unit and the second multiplexing unit is higher than that of the radio signal transmitted between the wireless communication device of the vehicle and the wireless communication unit of the roadside antenna apparatus.

3. The roadside narrowband wireless communication apparatus according to claim 1, wherein the first and second multiplexed signals transmitted between the first multiplexing unit and the second multiplexing unit are synchronous with the transmission baseband signal.

4. A roadside narrowband wireless communication apparatus comprising:
a roadside antenna apparatus having
    a wireless communication unit located in the vicinity of a road, the wireless communication unit sending a first radio signal to, and receiving a second radio signal from, a wireless communication device mounted on a vehicle traveling on the road, and
    a first multiplexing unit connected to the wireless communication unit and receiving a first multiplexed signal including a transmission baseband signal and an adjustment signal, the first multiplexing unit communicating the transmission baseband signal and the adjustment signal to the wireless communication unit for adjusting the wireless communication unit;
a roadside apparatus having
    a second multiplexing unit communicating with the roadside antenna apparatus, the second multiplexing unit sending the first multiplexed signal to, and receiving a second multiplexed signal from, the first multiplexing unit,
    a wireless communication control unit connected to the second multiplexing unit, the wireless communication control unit receiving the transmission baseband signal and sending the transmission baseband signal to the second multiplexing unit to convert the transmission baseband signal into part of the first multiplexed signal, and
    a network connection unit connected to the wireless communication control unit and to an external, wired communication network, the network connection unit sending the transmission baseband signal to the wireless communication control unit, and receiving the transmission baseband signal from a system connected to the wired communication network; and
an adjustment tool connected to the wireless communication control unit of the roadside apparatus, wherein the first and second multiplexed signals transmitted between the first multiplexing unit and the second multiplexing unit are packet signals comprising a header, a wireless communication unit address, a wireless communication control address, multiplex data, and a parity bit.

5. The roadside narrowband wireless communication apparatus according to claim 4, wherein the multiplexed communication between the first multiplexing unit and the second multiplexing unit is switched between ordinary communication and loop back communication by switching the header between 0 and 1.

6. The roadside narrowband wireless communication apparatus according to claim 4, wherein at least one sending data bit and at least one receiving data bit corresponding to the sending data bit are included in the multiplex data.

7. The roadside narrowband wireless communication apparatus according to claim 1, wherein the first and second multiplexed signals transmitted between the first multiplexing unit and the second multiplexing unit are optical signals.

8. A roadside narrowband wireless communication apparatus comprising: a roadside antenna apparatus having a wireless communication unit located in the vicinity of a road, the wireless communication unit sending a first radio signal to, and receiving a second radio signal from, a wireless communication device mounted on a vehicle traveling on the road, and a first multiplexing unit connected to the wireless communication unit and receiving a first multiplexed signal including a transmission baseband signal and an adjustment signal, the first multiplexing unit communicating the transmission baseband signal and the adjustment signal to the wireless communication unit for adjusting the wireless communication unit; a roadside apparatus having a second multiplexing unit communicating with the roadside antenna apparatus, the second multiplexing unit sending the first multiplexed signal to, and receiving a second multiplexed signal from, the first multiplexing unit, a wireless communication control unit connected to the second multiplexing unit, the wireless communication control unit receiving the transmission baseband signal and sending the transmission baseband signal to the second multiplexing unit to convert the transmission baseband signal into part of the first multiplexed signal, and a network connection unit connected to the wireless communication control unit and to an external wired communication network, the network connection unit sending the transmission baseband signal to the wireless communication control unit, and receiving the transmission baseband signal from a system connected to the wired communication network; and an adjustment tool connected to the wireless communication control unit of the roadside apparatus, wherein the first multiplexed signal includes header information and, when the wireless communication unit recognizes the header information of the first multiplexed signal as a loop-back code, the wireless communication unit transmits the first multiplexed signal by loop-back transmission at a constant time interval.

9. A roadside narrowband wireless communication apparatus comprising: a roadside antenna apparatus having a wireless communication unit located in the vicinity of a road, the wireless communication unit sending a first radio signal to, and receiving a second radio signal from, a wireless communication device mounted on a vehicle traveling on the road, and a first multiplexing unit connected to the wireless communication unit and receiving a first multiplexed signal including a transmission baseband signal and an adjustment signal, the first multiplexing unit communicating the transmission baseband signal and the adjustment signal to the wireless communication unit for adjusting the wireless communication unit; a roadside apparatus having a second multiplexing unit communicating with the roadside antenna apparatus, the second multiplexing unit sending the first multiplexed signal to, and receiving a second multiplexed signal from, the first multiplexing unit, a wireless communication control unit connected to the second multiplexing unit, the wireless communication control unit receiving the transmission baseband signal and sending the transmission baseband signal to the second multiplexing unit to convert the transmission baseband signal into part of the first multiplexed signal, and a network connection unit connected to the wireless communication control unit and to an external wired communication network, the network connection unit sending the transmission baseband signal to the wireless communication control unit, and receiving the transmission baseband signal from a system connected to the wired communication network; and an adjustment tool connected to the wireless communication control unit of the roadside apparatus, wherein the wireless communication unit sends a test pattern to the wireless communication control unit, receives a test pattern sent back from the wireless communication control unit, and compares the test pattern sent back from the wireless communication control unit with the test pattern sent to the wireless communication control unit.

10. The roadside narrowband communication apparatus according to claim 1, wherein one of the first multiplexing unit and the second multiplexing unit multiplexes the transmission baseband signal, the adjustment signal, and a wireless communication transmission reference clock signal.

11. A roadside narrowband wireless communication apparatus comprising:
   a roadside antenna apparatus having
      a wireless communication unit located in the vicinity of a road, the wireless communication unit sending a first radio signal to, and receiving a second radio signal from, a wireless communication device mounted on a vehicle traveling on the road, and
      a first multiplexing unit connected to the wireless communication unit and receiving a first multiplexed signal including a transmission baseband signal and an adjustment signal, the first multiplexing unit communicating the transmission baseband signal and the adjustment signal to the wireless communication unit for adjusting the wireless communication unit:
   a roadside apparatus having
      a second multiplexing unit communicating with the roadside antenna apparatus, the second multiplexing unit sending the first multiplexed signal to, and receiving a second multiplexed signal from, the first multiplexing unit,
      a wireless communication control unit connected to the second multiplexing unit, the wireless communication control unit receiving the transmission baseband signal and sending the transmission baseband signal to the second multiplexing unit to convert the transmission baseband signal into part of the first multiplexed signal, and
      a network connection unit connected to the wireless communication control unit and to an external, wired communication network, the network connection unit sending the transmission baseband signal to the wireless communication control unit, and receiving the transmission baseband signal from a system connected to the wired communication network;
   an adjustment tool connected to the wireless communication control unit of the roadside apparatus; and
   a serial data control apparatus connecting the adjustment tool to the wireless communication control unit so that the wireless communication control unit receives the command information as serial data.

\* \* \* \* \*